United States Patent [19]

Ambrose

[11] 4,416,146
[45] Nov. 22, 1983

[54] PLASTIC PIPE TESTER WITH FEEDBACK CONTROLLED PRESSURIZER

[76] Inventor: Roy A. Ambrose, 7854 S. Johnson Ct., Littleton, Colo. 80127

[21] Appl. No.: 355,032

[22] Filed: Mar. 5, 1982

[51] Int. Cl.³ ............................................. G01M 3/28
[52] U.S. Cl. ...................................................... 73/49.5
[58] Field of Search ................................. 73/49.5, 49.1

[56] References Cited

U.S. PATENT DOCUMENTS

| | | | |
|---|---|---|---|
| 2,895,328 | 7/1959 | Payne, Jr. et al. | 73/49.1 |
| 3,151,478 | 10/1964 | Heldenbrand | 73/49.1 X |
| 3,383,905 | 5/1968 | Sewos et al. | 73/49.5 X |
| 3,554,006 | 1/1971 | Windle | 73/49.5 |
| 3,916,673 | 11/1975 | Gass et al. | 73/49.5 X |
| 4,167,868 | 9/1979 | Bobo et al. | 73/49.5 |

OTHER PUBLICATIONS

Rig for Testing Large-Diameter Pipes Under Pulsating Internal Pressure, Aistov, Industrial Laboratory, vol. 41, No. 1, pp. 141-142, Jan. 1975.

*Primary Examiner*—Gerald Goldberg
*Assistant Examiner*—Tom Noland

[57] ABSTRACT

The disclosed apparatus subjects samples of pipe, preferably plastic pipe, to controlled internal hydrostatic pressure in order to test the ability of that sample to withstand such pressure without catastrophic failure. A hydraulic pressure source (10) which preferably includes a variable volume compensated pump (12) and pair of accumulators (17) and (18) and applies the source pressure through a servo controlled pressure control valve (22) to a water filled sample (S). The hydrostatic pressure of the water within sample (S) generates an electrical signal proportional thereto via pressure transducer (24) and amplifier (25). This first signal is compared to an electronically generated second signal from a function generator (27). This second signal is proportional to the desired pressure within the sample (S). These first and second signals are compared by differential amplifier (28) which generates a third signal proportional to the difference between the first and second signals. This third signal is transmitted to valve (22) via signal processing circuitry (29) which controls the application hydraulic fluid to the pressure transmitter (32) in order precisely and controllably apply the hydrostatic pressure to the sample (S) over the testing period.

4 Claims, 1 Drawing Figure

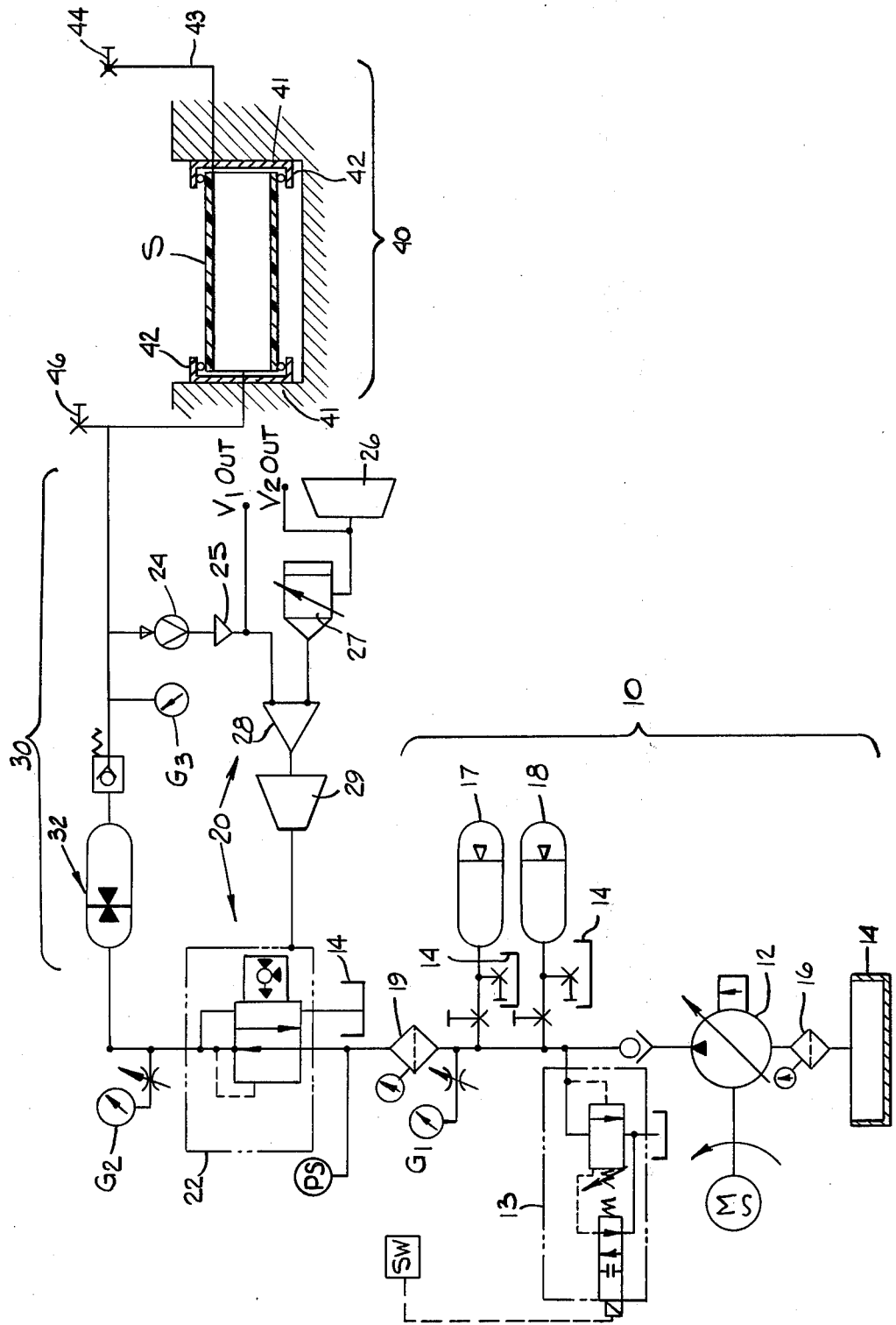

PLASTIC PIPE TESTER WITH FEEDBACK CONTROLLED PRESSURIZER

TECHNICAL FIELD

The present invention relates to the field of testing pipe to determine its ability to withstand elevated internal pressures without catastrophic failure or rupture. More specifically the disclosed invention relates to apparatus for applying hydrostatic pressures to the inside of a test sample of plastic pipe in a controlled manner in order to test that sample's ability to withstand such pressure without catastrophic failure.

BACKGROUND OF PRIOR ART

Extruded thermoplastic pipe is often used to carry potable water and other liquids at hydrostatic pressures in the range of 160 to 400 pounds per square inch. In order to determine the ability of such extruded plastic pipe to withstand, for long periods, this relatively high internal hydrostatic pressure, it is necessary to test samples of such pipe at even higher pressures. It is also necessary to determine the ability of the pipe to withstand without rupture certain overpressure conditions, such as those conditions resulting from a surge of water pressure within the pipe.

In the past these tests have been performed by connecting a sample of such pipe to a source of water under pressure. The amount of pressure to which the pipe was to be subjected was monitored by an operator who observed a water pressure gauge. The internal pressure in the pipe sample was increased slowly by manually operating a pressure control valve connected between the water filled pipe and the water pressure source. A certain standardized test used to determine the ability of the pipe to withstand hydrostatic pressure without bursting calls for the internal pressure to be increase from 0 to the maximum pressure of the test within 60 seconds. Thus, in order to be a fair test the operator must being the pressure from 0 to the highest test pressure slowly and uniformly within that 60 second period. During this period, the sample of plastic pipe would yield both elastically as well as plastically in response to this increasing pressure. In doing so the rate in which the water entered the test sample would tend to change erratically. For example, as the yield point was reached the rate of water intake into the sample would suddenly increase. This sudden intake in water resulted in a pressure decrease within the pipe sample followed almost immediately by a sudden pressure increase, either as a result of the operator increasing the flow of pressurized water into the sample or the tendency of the sample itself to suddenly reduce its instantaneous rate of strain. The resulting fluctuations in the pressure application produced unpredictable and unrepeatable dynamic forces on the pipe sample which affected the validity and accuracy of the intended hydrostatic test procedure.

BRIEF SUMMARY OF THE INVENTION

Accordingly, the present invention solves these problems by providing an apparatus for testing a sample of plastic pipe by internally pressurizing said sample in a controlled manner comprising a source of hydraulic pressure, a means of transmitting this hydraulic pressure to said sample to internally pressurize said sample, a pressure sensing means for generating a first electrical signal, which first signal being porportional to the hydraulic pressure within said sample, a function generator for generating a second electrical signal porportional to the desired hydraulic pressure within said sample as a function of time, and means for generating a third electrical signal by combining said first electrical signal and said second electrical signal, and means for controlling the pressure of hydraulic fluid from said source to said means for transmitting in response to said third electrical signal whereby the rate of application of hydraulic pressure to said sample may be controllably and repeatably applied.

BRIEF DESCRIPTION OF THE DRAWING

The drawing shows an electro-hydraulic schematic of the apparatus according to the instant invention.

DETAILED DESCRIPTION OF THE INVENTION

The preferred embodiment shown in the sole drawing comprises four sub-assemblies 10, 20, 30, 40. The sub-assembly 10 comprises components making up the hydraulic pressure source. The second sub-assembly, pressure control system 20 is connected to the fluid pressure from supply 10 and transmits this pressure via pressure transmitting means 30 to the pipe sample holder apparatus 40.

In the preferred embodiment the hydraulic pressure source 10 includes a reservoir 14 of conventional petroleum based hydraulic fluid. This fluid is withdrawn from the reservoir 14 through strainer 16 by motor operated pump 12. The pump 12 is preferably a variable volume, pressure compensated type having a capacity of about 5 gpm (gallons per minute) at about 2000 psi. The hydraulic fluid output of the pump 12 passes through a check valve and ultimately through a pressure filter 19 to the pressure control system 20. During operation of the system however, some of the hydraulic fluid passes into first accumulator 17 and/or second accumulator 18. Both accumulators 17 and 18 are of the pressurized gas type. The accumulator 17 is pressurized to a different level than that of 18. In particular, accumulator 17 is pre-charged with a nitrogen gas to 350 psi while second accumulator 18 is pre-charged to about 1000 psi. Both of these accumulators may be isolated from the system by hand operated valves and may be discharged to reservoir 14 similarly through hand operated valves as shown. The system supply pressure is controlled by control valve 13. This control valve 13 is operated by a solenoid pilot valve as shown. The hydraulic pressure sub-assembly 10 is connected to the servo-controlled pressure control valve 22. As will be set forth in further detail, the valve 22 precisely regulates the magnitude of fluid pressure applied to sample S from sub-assembly 10 via pressure transmitting sub-assembly 30 and sample holder 40.

The pressure transmitting sub-assembly includes a pressure transmitter 32 which is merely a hydraulic fluid to water transmitter having an overall capacity of about five gallons. The water side of the pressure transmitter 32 is connected via a series of pipes to the sample holder 40. The sample holder 40 comprises two gasketed end caps 42 size of to seal to the outer surface of the ends of the pipe sample S to be tested. The gasketed end caps 42, with the sample S gripped therebetween, are supported between a pair of bolsters 41 which prevent the end caps 42 from being forcefully ejected by the water pressure during the testing of sample S.

In order to aid in filling S with water, means 30 includes a water supply valve 46 which is connected to ordinary water main pressure. The sample holder 40 includes an air vent 43 and vent shut off valve 44 which, when operated in conjunction with the water supply valve 46, displaces any air within the sample with ordinary tap water.

In fluid communication with supply 30 is the pressure transducer 24. Pressure transducer 24 monitors the pressure of the water within the sample and, together with its associated amplifier 25, generates a first electrical signal proportional to the actual hydraulic pressure in the sample S. Also associated with the control valve 22 is a function generator 27 which is of conventional design. In this particular embodiment function generator 27 generates a ramp signal. This ramp signal can be adjusted to be proportional to the desired hydraulic pressure within the sample as a function of time. Electronic timing circuit 26, also of conventional construction, initiates the operation of generator 27. Its output signal is monitored at V2. The first electrical signal from pressure transducer 24 and amplifier 25 and the second signal from signal generator generator 27 are led to a differential amplifier 28. The differential amplifier 28 generates a third signal proportional to the difference between the first signal generated by pressure transducer and amplifier 25 and second signal from of signal generator 27.

This third signal is conducted to the servo-controlled valve 22 after being conditioned by signal processor 29. Servo valve 22 is preferably of a design which is very quick acting and is able to adjust the rate of application of hydraulic pressure from source 10 to pressure transmitter 32 in rapid response to the signal from signal processor 29. A commercially available valve found most suitable for use in the disclosed apparatus is Model 3DS2EH22-10/A2140Z8 obtainable from Rexroth Company. Signal processor 29 can be easily designed to accomodate the response characteristics of the servovalve chosen to produce the proper operation of that valve in response to this control signal from amplifier 28. The pressure transducer 24 can also be conventional. In the preferred embodiment, Model PS300G300 pressure transducer, also available from Rexroth Company, has been found adequate. Once the output characteristics of the selected transducer are known as the selection of the proper amplifier 26 and differential amplifier 28 is well within ordinary skill, using the above teaching.

An example of the operation of the disclosed apparatus will now be set forth. A sample extruded of polyvinyl chloride pipe such as PVC pipe marketed under the trademark "BLUE BRUTE" by Manville Corporation is cut to fit the sample holder 40. The wall thickness of the sample is measured at various points around the circumference in order to determine the minimum wall thickness of the sample. Using a simple calculation the hydrostatic pressure to which the sample should be subjected in order to produce a maximum wall stress is determined. The sample S is installed in the sample holder 40 as shown. The operator adjusts signal generator 27 to produce an electrical signal at the end of a set period of time which is proportional to the just calculated maximum hydrostatic pressure. The timing circuit 26 is also adjusted so as to produce its timing signal for a set period, which in this example is 60 seconds. The signal generator is pre-constructed to vary the second signal from 0 to the maximum output in a linear manner over the time interval chosen, thus in this case the signal generator 27 is a "ramp generator". It should be understood however, that other time varying signals may be desired in order to simulate other hydrostatic test conditions.

Switch SW is closed and the pump 12 is operated, control valve 13 is closed allowing hydraulic pressure to build and charge the accumulators with hydraulic fluid to a pressure well above the maximum calculated pressure to which the sample will be subjected (e.g. 2000 psi). This pressure is monitored on gauge G1. In the meantime, vent shutoff valve 44 is opened and the water supply valve 46 is opened to fill the sample S with water. Once the air has been purged by this system the vent shutoff valve 44 is closed, as is the water supply valve 46. At this time gauge G2 should show 0 gauge pressure, as will water pressure gauge G3. Outputs V1 and V2 are usually connected to a strip chart recorder in order to record the actual pressure to which the sample is being subjected as well as the time signal generated by signal generator 27.

The test is initiated by initiating the timing circuit 26, which in turn begins the signal from generator 27, this signal in turn produces a signal, via 28 and 29, which immediately begins to open valve 22 and hydraulic pressure begins to pressurize the water in sample S through the pressure transmitter 32. The differential amplifier constantly monitors the output of pressure transducer/amplifier combination 24 and 25, compares that signal with the time varying signal from generator 27, and applies the resulting signal to the control valve 22 via the signal processor 29. As the sample S is pressurized, it will yield in response to this ever increasing pressure, resulting in water in varying rates of flow, to pass from the pressure transmitter 32 into the sample. Any reduction in water pressure is instantly sensed by the pressure transducer 24, this drop in water pressure is immediately compensated for by the operation of valve 22 in response to the resulting signal generated by the differential amplifier 29.

Of course hydraulic pressure source 10 must be able to supply this rapidly fluctuating demand for pressurized hydraulic fluid. The use of the accumulators 17 and 18 and the variable volume pressure compensated pump 12 result in such a responsive souce of hydraulic pressure. Clearly the variable volume pump 12 alone could not instantaneously respond to a sudden increase in volumetric flow. However, the first accumulator 17 and second accumulator 18 are able to respond quite quickly to such sudden fluctuations in demand over a wide range of supply pressures. Pump 12 is able to replenish the first accumulator 17 and second accumulator 18 shortly after such a surge in demand so that they are constantly at the ready.

The test is concluded by the sample S either enduring the full duration of the test, or rupturing at some time during the aplication of hydrostatic pressure, at which time the pressure is removed from the sample by operation of the control valve 22 and the sample is removed from the sample holder.

We claim:

1. An apparatus for testing a sample of plastic pipe by internally pressurizing said sample in a controlled manner, comprising:
   (a) a source of hydraulic pressure;
   (b) means for conducting at least a portion of said hydraulic pressure to said sample to internally pressurize said sample;

(c) a pressure monitoring means for generating a first electrical signal proportional to the hydrostatic pressure within said sample;
(d) a function generator for generating a second electrical signal proportional to the desired hydrostatic pressure within said sample as a function of time;
(e) a means for generating a third electrical signal proportional to the difference between said first electrical signal and said second electrical signal; and
(f) a means for controlling flow of hydraulic fluid from said source to said means for transmitting in response to said third electrical signal.

2. An apparatus as in claim 1, wherein said source of hydraulic pressure comprises a variable volume pressure compensated pump and further comprises at least one pressurized gas accumulator connected to the output of said pump.

3. An apparatus as in claim 2, wherein is said means for conducting at least a portion of said hydraulic pressure to said sample includes a hydraulic fluid-to-water pressure transmitter and means for filling said sample with water connected to the water side of said pressure transmitter.

4. An apparatus as in claim 2, wherein said means for controlling the flow of hydraulic fluid in response to said third signal comprises a servo controlled pressure control valve connected to said means for generating said third signal.

* * * * *